United States Patent [19]

Colasanti et al.

[11] 4,101,093
[45] Jul. 18, 1978

[54] FRICTION DAMPENED PENDULUM SENSOR

[75] Inventors: Arduino Colasanti, East Detroit, Mich.; Josef M. Cachia, Louvain, Belgium; Heino Arff, Henstedt-Ulzburg, Germany

[73] Assignee: Allied Chemical Corporation, Morris Township, N.J.

[21] Appl. No.: 740,909

[22] Filed: Nov. 11, 1976

[51] Int. Cl.² .................. A62B 35/02; B65H 75/48
[52] U.S. Cl. .................................................. 242/107.4 A
[58] Field of Search ............... 242/107.4 A; 297/388; 280/744–747; 180/82 C; 200/52 A, 61.45 R, 61.45 M, 61.52, 61.58 B; 188/135–139

[56] References Cited

U.S. PATENT DOCUMENTS

| | | | |
|---|---|---|---|
| 3,489,367 | 1/1970 | Kovacs et al. | 242/107.4 A |
| 3,831,878 | 8/1974 | Griffin | 242/107.4 A |
| 3,946,965 | 3/1976 | Singh | 242/107.4 A |

Primary Examiner—Harvey C. Hornsby
Assistant Examiner—John M. Jillions
Attorney, Agent, or Firm—Roger H. Criss

[57] ABSTRACT

A pendulum sensor avoids undesired actuation by employing specially designed contact surfaces between a pendulum head and a pendulum support. Each contact surface includes a circumferential inclined portion. The inclined portions are disposed at an angle with reference to a vertical plane. The pendulum support includes an upwardly extnding circumferential projection. The sensor may be used in a safety belt retractor in a vehicle.

4 Claims, 2 Drawing Figures

FRICTION DAMPENED PENDULUM SENSOR

BACKGROUND OF THE INVENTION

The invention relates to an improvement in a pendulum used as a sensor for changes in acceleration, deceleration or orientation. More particularly, the invention relates to a pendulum in which a pendulum head and pendulum support each have a contact surface which dampens vibrations, oscillation and spiralling to prevent undesired actuation. The pendulum may be used in a safety belt retractor in a vehicle such as an automobile.

Pendulums used as a sensor in a safety belt retractor are described in U.S. Pat. Nos. 3,489,367 to Kovacs et al.; 3,838,831 to Bell; 3,226,053 to Petty; 3,343,765 to Baker; 3,508,720 and 3,578,260 to Kell; 3,885,753 to Connors; 3,889,898 to Ziv; 3,831,878 to Griffin; 3,439,932 to Lewis et al.; and in U.S. Patent Application No. 660,593 filed Feb. 23, 1976 in the name of E. Buff and J. Plaut.

SUMMARY OF THE INVENTION

The present invention relates to a pendulum apparatus for sensing changes in acceleration, deceleration or orientation. The apparatus includes a substantially circular pendulum head, a pendulum stem and a substantially circular support for the pendulum head. More particularly, the present invention relates to an improvement for avoiding undesired actuation of the pendulum apparatus. Such undesired actuation may occur, for example, as the result of vibration, oscillation or "spiraling."

The pendulum apparatus includes: a first circumferential contact surface and a second circumferential contact surface. The first circumferential contact surface is on an underside of the pendulum head. The first contact surface extends circumferentially around an inner circumference of at least part of the underside of the pendulum head and extends outward radially from a point adjacent to the pendulum stem.

The second circumferential contact surface is on the pendulum support. The first contact surface of the pendulum head rests on the second contact surface of the support. The second contact surface supports the pendulum head. The first contact surface and the second contact surface each have a circumferential inclined portion. The inclined portions are disposed at an angle with reference to a vertical plane. At least part of the inclined portion of the first contact surface rests on at least part of the inclined portion of the second contact surface.

The pendulum support includes an upwardly extending circumferential projection having an upper portion and a bottom portion.

DETAILED DESCRIPTION

Figure 1:
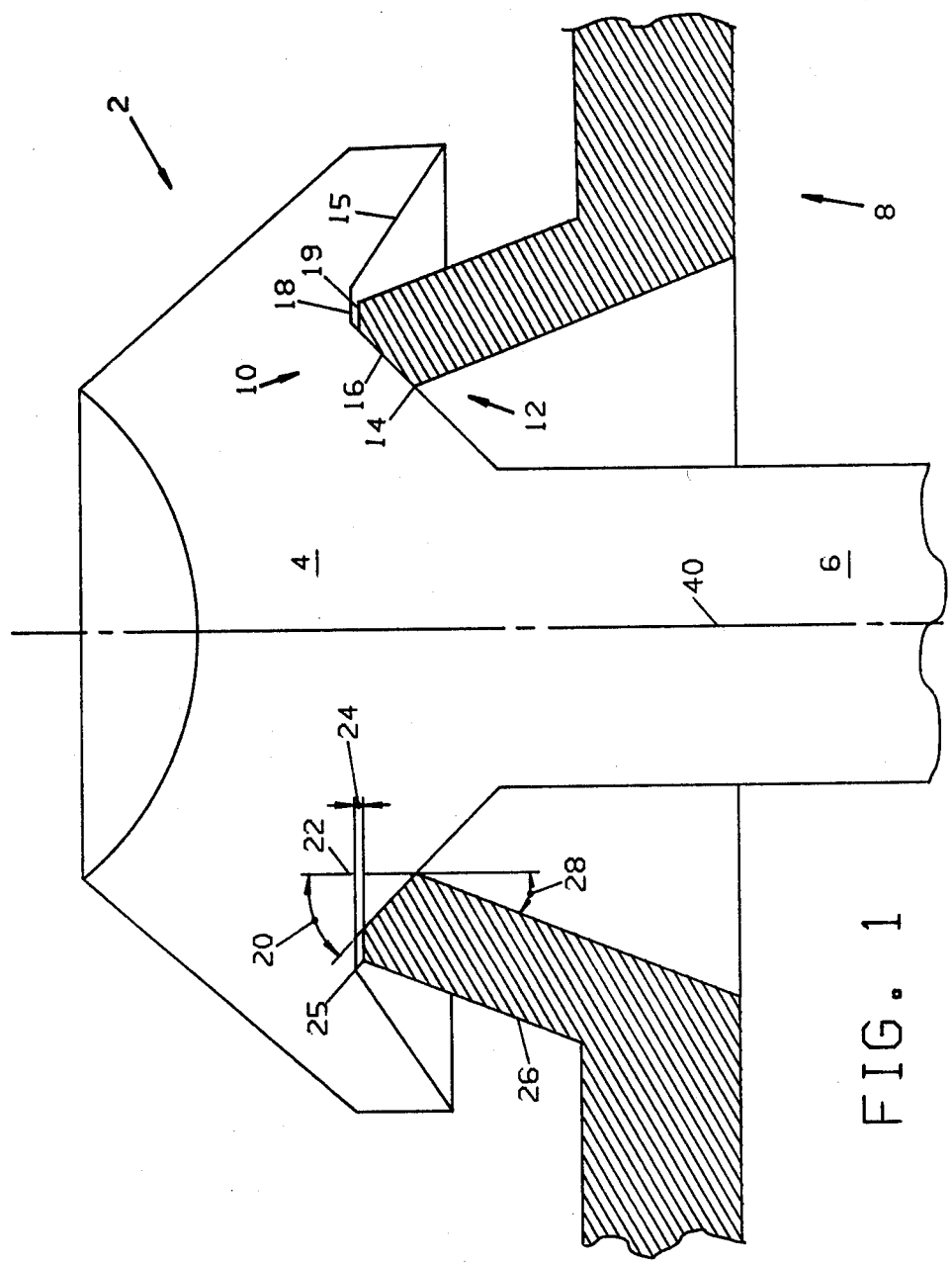
FIG. 1 is a vertical cross-section of the pendulum apparatus of the present invention.

Referring to FIG. 1, the pendulum apparatus of the present invention, referred to generally by the numeral 2, includes a substantially circular pendulum head 4, a pendulum stem 6 and a substantially circular support, referred to generally by the numeral 8, for the pendulum head 4. The improvement of the present invention for the pendulum apparatus 2 includes: a first circumferential contact surface, referred to generally by the numeral 10, and a second circumferential contact surface, referred to generally by the numeral 12. The first circumferential contact surface 10 is on at least part of an underside of the pendulum head 4. The first contact surface 10 extends circumferentially around an inner circumference of the underside of the pendulum head 4 and extends outward radially from a point 14 adjacent to the pendulum stem 6 to a sloping circumferential overhang 15 on the outer circumference of the pendulum head 4.

The second circumferential contact surface 12 is on the pendulum support 8. At least a part of the first contact surface 10 of the pendulum head 4 rests on at least part of the second contact surface 12 of the support 8. At least a part of the second contact surface 12 supports the pendulum head 4. The first contact surface 10 and the second contact surface 12 each have a circumferential inclined portion 16. Preferably, the first contact surface 10 has a circumferential horizontal portion 18 and the second contact surface 12 also has a circumferential horizontal portion 19. The inclined portions 16 are disposed at an angle 20 with reference to a vertical plane 22. Preferably, the angle 20 of the inclined portions 16 of the first contact surface 10 and the second contact surface 12 with the vertical plane 22 is between 30° and 60°. Most preferably, the angle 20 of the inclined portions 16 is approximately 45°.

The horizontal portion 18 extends outward radially from the inclined portion 16 of the first contact surface 10 to the overhang 15. The horizontal portion 19 of the second contact surface extends outward radially from the inclined portion 16 of the second contact surface 12 to an outer circumference on the second contact surface 12. At least part of the inclined portion 16 of the first contact surface 10 rests on at least part of the inclined portion 16 of the second contact surface 12. Ideally, at least part of the horizontal portion 18 of the first contact 10 may rest on at least part of the horizontal portion 19 of the second contact surface 12. Preferably, for ease of manufacture and to allow for reasonable tolerances, the horizontal portion 18 does not rest on horizontal portion 19. Instead, there is a small gap 24 between horizontal portion 18 and horizontal portion 19. When the pendulum apparatus 2 is actuated by acceleration, deceleration or change in orientation, the pendulum head 4 and stem 6 can swing in any lateral direction. If the swing is large enough, the horizontal portion 18 will pivot upon the horizontal portion 19 at pivot point 25 which is located on the outer circumference of horizontal portion 19.

The pendulum support 8 includes an upwardly extending circumferential projection 26. The upper portion of the projection 26 is inclined inwardly with reference to the bottom portion of the projection 26 at an angle 28 of between 10° and 45°.

Figure 2:
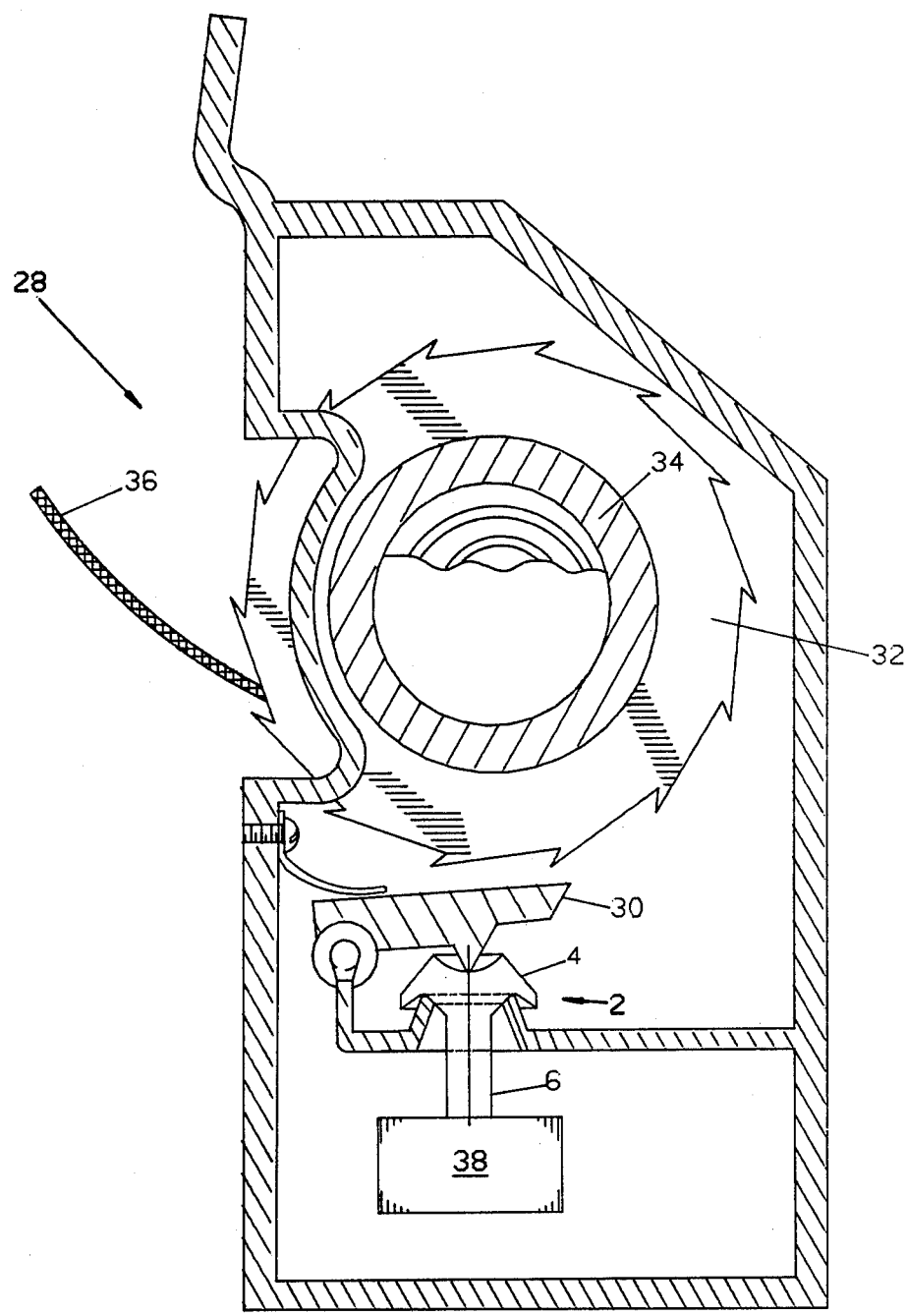
FIG. 2 is a vertical cross-section of a vehicle safety belt retractor using the pendulum apparatus of the present invention.

Referring to FIG. 2, the pendulum apparatus 2 may be used in a safety belt retractor 28 for the purpose of actuating a pawl 30 under emergency conditions to engage a ratchet wheel 32 and lock a reel 34 to prevent further unwinding of a safety belt 36. As the result, the pendulum apparatus 2 of the present invention may be used as a sensor for sensing a change in acceleration, deceleration or orientation of a vehicle in which the retractor 28 is mounted. Further details and explanation of the operation of such a pendulum sensor in a retractor 28 are disclosed in U.S. Pat. No. 3,838,831 to Lon E. Bell issued Oct. 1, 1974.

A detent action is provided by the pivotal movement between the head 4 and the pivot point 25 on the top of projection 26. The pendulum apparatus 2 does not begin to move until the center of mass of a pendulum weight 38 of the pendulum apparatus 2 is aligned with a substantially vertical plane passing through pivot point 25. Accelerations below the preselected magnitude, such as those generated by road vibration and the like, have a magnitude insufficient to bring the center of mass of the pendulum weight 38 into alignment with the substantially vertical plane through pivot point 25. The pendulum apparatus 2 remains in the substantially vertical position and is not set in motion until its actuating movement is required. The pendulum head 4 will not be lifted up to actuate the pawl 30 until the force of acceleration on the pendulum weight 38 overcomes a moment which is the product of the force resulting from the weight of the pendulum apparatus 2 plus the pawl 30 and the distance from the pivot point 25 to a vertical center line 40. Hence, the pendulum components are less subject to wear and the distance moved by the pendulum head 4 during actuation of the pawl 30 remains constant. Accordingly, the retractor 28 has higher reliability and lower maintenance costs than retractors inertially actuated by pendulum means suspended from a ball and socket type mount.

The present invention dampens vibrations, oscillations and "spiraling" and, as a result, avoids undesired actuation of the pendulum apparatus 2 and undesired locking of the retractor 28. For example, a pendulum apparatus 2 used in a retractor mounted in a vehicle may be subjected to vibrations resulting from road vibration or engine vibration. The present invention dampens such vibrations until swing of the pendulum head 4 and pendulum stem 6 reaches a predetermined amount. As another example, the pendulum apparatus 2 used in a retractor may be actuated as the vehicle goes around a sharp turn. After the vehicle completes the turn and the pendulum head 4 and pendulum stem 6 swing back toward a substantially vertical position, the pendulum head 4 and pendulum stem 6 have a tendency to oscillate before coming to rest in a substantially vertical position. During such oscillation, the locking mechanism of the retractor might otherwise maintain the retractor in a locked position. The present invention dampens such oscillation and causes the pendulum head 4 and pendulum stem 6 to more quickly return to a rest position in a substantially vertical configuration, which results in faster unlocking of the retractor. As a third example, if the vehicle is hit from the side and begins to spin around, it may cause the pendulum head 4 to spin in a substantially horizontal plane with reference to the pendulum support 8. Such spinning may cause "spiraling", that is, continued spinning of the pendulum head 4 in a substantially horizontal plane after the vehicle stops spinning. The present invention reduces such "spiraling".

The force applied to the vehicle necessary to actuate the pendulum apparatus 2 may be expressed in terms of acceleration due to gravity, which is approximately 32.2 ft/sec$^2$, hereinafter abbreviated as "g". In a typical example, the pendulum apparatus 2 may be designed so that it actuates and causes locking of the retractor 28 when a force of approximately 0.4 g is applied to the retractor 28, which causes the pendulum apparatus 2 to swing approximately 12° from its vertical position. Under such circumstances, if the pendulum swings more than 12°, the retractor 28 will lock. If the pendulum swings less than 12°, the retractor 28 will not lock. There is also about 3° of lost motion in the pendulum swing. Such lost motion is a result of frictional forces in the various components of the system, including the pawl and ratchet wheel.

We claim:

1. In a safety belt retractor having a pendulum for sensing a change in acceleration, deceleration or orientation of a vehicle in which said retractor is mounted, said pendulum including a substantially circular pendulum head, a pendulum stem connected to a pendulum weight and a substantially circular support for said pendulum head, said pendulum head having an overhang around an outer circumference of said pendulum head, an improvement for avoiding undesired actuation of said pendulum comprising:

a first circumferential contact surface on a portion of an underside of said pendulum head, said first contact surface extending circumferentially around an inner circumference of at least part of said underside of said pendulum head and extending radially from a point adjacent to said pendulum stem to said overhang;

a second circumferential contact surface on said support; at least part of said first contact surface of said pendulum head resting on at least part of said second contact surface of said support, at least part of said second contact surface supporting said pendulum head;

said first contact surface and said second contact surface each having a circumferential substantially linear inclined portion and a circumferential horizontal portion, said inclined portions disposed at an angle with reference to a vertical line, said horizontal portion of said first contact surface extending outward radially from said inclined portion of said first contact surface to said overhang of said pendulum head, and said horizontal portion of said second contact surface extending outward radially from said inclined portion of said second contact surface to an outer circumference of said second contact surface;

said horizontal portions extending outward radially from an outer circumference of said inclined portions, at least part of said inclined portion of said first contact surface resting on at least part of said inclined portion of said second contact surface, said contact surfaces having a gap between said horizontal portion of said first contact surface and said horizontal portion of said second contact surface; and said pendulum support comprising an upwardly extending circumferential projection upon which said pendulum head pivots during actuation.

2. The apparatus according to claim 1 wherein the angle of said inclined portions of said first contact surface and said second contact surface with said vertical plane is between 30° and 60°.

3. The apparatus according to claim 1 wherein the angle of said inclined portions of said first contact surface and said second contact surface with a vertical plane is approximately 45°.

4. The apparatus according to claim 1 wherein said circumferential projection of said pendulum support comprises an upper portion and a bottom portion, said upper portion of said projection inclined inwardly with reference to said bottom portion of the projection.

* * * * *